(12) United States Patent
Benedetto et al.

(10) Patent No.: US 12,434,153 B2
(45) Date of Patent: Oct. 7, 2025

(54) AUTOMATED TRACKING OF EARNED IN-GAME ACTIONS FOR GRANTING AN NFT BACKED DIGITAL ASSET

(71) Applicant: Sony Interactive Entertainment LLC, San Mateo, CA (US)

(72) Inventors: Warren Benedetto, San Mateo, CA (US); Matthew Tomczek, San Mateo, CA (US); Steven Trombetta, San Mateo, CA (US)

(73) Assignee: Sony Interactive Entertainment LLC

( * ) Notice: Subject to any disclaimer, the term of this patent is extended or adjusted under 35 U.S.C. 154(b) by 0 days.

(21) Appl. No.: 18/521,469

(22) Filed: Nov. 28, 2023

(65) Prior Publication Data

US 2024/0091652 A1    Mar. 21, 2024

Related U.S. Application Data

(63) Continuation of application No. 17/549,849, filed on Dec. 13, 2021, now Pat. No. 11,865,457.

(51) Int. Cl.
*A63F 13/00* (2014.01)
*A63F 13/69* (2014.01)
(Continued)

(52) U.S. Cl.
CPC ............ *A63F 13/792* (2014.09); *A63F 13/69* (2014.09); *A63F 13/87* (2014.09)

(58) Field of Classification Search
CPC ...................................................... A63F 13/79
See application file for complete search history.

(56) References Cited

U.S. PATENT DOCUMENTS 10,505,726 B1 *  12/2019  Andon ................. H04L 9/3297
2019/0299105 A1   10/2019  Knight et al.
(Continued)

FOREIGN PATENT DOCUMENTS

CN       110475594 A     11/2019
JP       2019076350 A     5/2019
(Continued)

OTHER PUBLICATIONS

"Co-Sponsor Notice of Guild Battle Award at MCHC", CryptoSpells ( ******** ) —Medium, Available online at: https://medium.com/cryptospells/2021%E5%B9%B45%E6%9C%88%E4%BB%A5%E9%99%8D%E3%81%AE%E3%82%AE%E3, May 1, 2021, 21 pages.
(Continued)

*Primary Examiner* — David L Lewis
*Assistant Examiner* — Eric M Thomas
(74) *Attorney, Agent, or Firm* — Kilpatrick Townsend & Stockton LLP

(57) ABSTRACT

Methods and systems for tracking a game asset used in a video game includes receiving game inputs provided by a player during gameplay of the video game. The game inputs are analyzed to determine when the game inputs result in the occurrence of a significant event in the video game. A digital asset is awarded to the player providing the game inputs for the significant event. A non-fungible token is generated for the digital asset earned by the player and a value indicative of intrinsic value of the significant event is computed and associated with the digital asset. The non-fungible token is used to monitor use of the digital asset.

16 Claims, 6 Drawing Sheets

(51) Int. Cl.
*A63F 13/792* (2014.01)
*A63F 13/87* (2014.01)

(56) References Cited

U.S. PATENT DOCUMENTS

| | | | | |
|---|---|---|---|---|
| 2020/0005284 | A1* | 1/2020 | Vijayan | G06Q 20/065 |
| 2020/0023273 | A1 | 1/2020 | Tsurusaki et al. | |
| 2020/0273048 | A1* | 8/2020 | Andon | G06Q 10/02 |
| 2020/0394651 | A1 | 12/2020 | Kreder et al. | |
| 2021/0118085 | A1* | 4/2021 | Bushnell | H04L 9/50 |

FOREIGN PATENT DOCUMENTS

| | | | |
|---|---|---|---|
| JP | 2020113279 A | 7/2020 |
| JP | 2021048430 A | 3/2021 |
| JP | 2021526430 A | 10/2021 |
| JP | 2022514466 A | 2/2022 |

OTHER PUBLICATIONS

"How to Start, Play, and Earn a Blockchain Game", First Edition, Jan. 27, 2021, 34 pages.

"My Crypto Heroes Technology Stack Blockchain Game Support Mechanism My Crypto Heroes", Logmi Business, Available online at: https://logmi.jp/brandtopics/321622, Aug. 9, 2019, 13 pages.

"Research Study Report on Privacy Protection and Traceability of Financial Transactions Using Blockchain", Financial Services Agency, Mar. 20, 2019, 50 pages.

"The Future of Currencies and the Significance of Virtual Currencies—What Digitalization and Blockchain Bring About", Materials Prepared by the Research Office of the Committee on Finance and Finance of the House of Councillors, "The Prism of Economics", Oct. 1, 2020, 21 pages.

"Until the World's Best Blockchain Game "My Crypto Heroes" is made How to make My Crypto Heroes", Logmi Business, Available online at: https://logmi.jp/brandtopics/321621, Aug. 8, 2019, 13 pages.

Office Action issued in related Japanese Application No. 2024-535249 on Jul. 15, 2025; 21 pages.

Manzoku, "How to Build MyCryptoHerroes / Architecture of My Crypto Heroes", Amazon Web Services Summit Tokyo Startup Architecture Of The Year 2019 - Speaker Deck, Available online at: https://speakerdeck.com/rmanzoku/architecture-of-my-crypto-heroes, Jun. 13, 2019, 21 pages.

\* cited by examiner

AUTOMATED TRACKING OF EARNED IN-GAME ACTIONS FOR GRANTING AN NFT BACKED DIGITAL ASSET

CLAIM OF PRIORITY

This application is a continuation of and claims priority to and the benefit of U.S. application Ser. No. 17/549,849 filed on Dec. 13, 2021, entitled "Automated Tracking Of Earned In-Game Actions For Granting An NFT Backed Digital Asset," the disclosure of which is incorporated herein by reference in its entirety for all purposes.

TECHNICAL FIELD

The present disclosure relates to tracking use of a digital asset in a video game using a non-fungible token.

BACKGROUND OF THE DISCLOSURE

The video gaming industry has seen many changes in recent years. One in particular is the ever growing popularity of the video games. With the growing popularity of the video games, game developers are trying to find ways to generate and retain interest in the video game for the players. Some ways of generating interest in the players may be to provide ways for the players to keep track of events and other happenings in the video game. Players may use game objects available within the video game to provide game inputs that affect game state of the video game. In some cases, more than one game object may be used to accomplish a particular task, such as a challenge, in the video game. As more than one game object can be used to accomplish the same task, it becomes increasingly hard for the players to keep track of which game objects they need to possess, what capabilities each game object possesses, which game objects they need to use to accomplish the different tasks.

It is in this context that embodiments of the disclosure arise.

SUMMARY

Implementations of the present disclosure relate to systems and methods for tracking use of digital assets in a video game. The video game provides various in-game digital assets (i.e., game objects) that players can collect or buy for use in the video game. Players can buy these game objects for a price set by a game developer. In addition to purchasing the game objects at the price set by the game developer, the players may earn select ones of digital assets based on their game playing skills. For instance, a player may perform certain moves or actions or provide game inputs using a game object that they own and such moves or actions or game inputs may result in the occurrence of a significant event in the video game. The significant event achieved by the player may be a one-of-a-kind event and in response to the occurrence of the significant event, the player may earn a digital asset (e.g., a game object with special powers). The digital asset earned by the player may be one-of-a-kind. A value may be computed for the digital asset based on the intrinsic value of the significant event achieved by the player. The digital asset earned by the player may be used in the video game or offered for sale or trade to other players of the video game. The value for the trade/sale may be the value computed for the digital asset or may be set by the player. Due to the uniqueness of the significant event for which the digital asset was awarded to the player, the digital asset may be a valuable game item that can be used to overcome certain challenges that may generally not be possible to overcome with other game objects. And, unlike certain game objects that can be purchased in multiples, the digital asset earned by the player are single purchase digital asset, in that only one person (i.e., the player who earned the digital asset) has ownership.

Details of the digital asset are captured in the metadata associated with the digital asset. The metadata associated with the digital asset includes details as ownership, and attributes that define the capabilities possessed by the digital asset, functionalities of the digital asset, and/or entitlements provided to the player due to the possession of such digital asset. The digital asset earned by the player may be used within the video game, sold or traded to other players of the video game, or may be ported to other video games executing on same or different gaming platforms as the video game, and also may be collected and posted by the player as an achievement in social media posts. The sale or trade may be based on the value of the digital assets computed in accordance to their functionality or the player's achievement or entitlements within the video game.

The metadata of the digital asset may be used to generate a non-fungible token (NFT). The NFT generated for the digital asset is associated with the player who earned the digital asset in the video game. The digital asset may be a special game object or may be a privilege accorded to the player within the video game, or may be a special item, such as a key or a golden ticket awarded to the player with capabilities to unlock a special game item (i.e., a game object that possesses unique power) or a certain level within the video game. In some cases, the player may wish to port the key or golden ticket that has the capability to unlock a certain item or a certain level or unlock a special game item in the video game, to a second video game to perform similar or different function or provide special privileges to the player to perform certain actions within the second video game. For example, a first game object may have been used to provide certain effects or achieve certain level in the first video game or perform certain function in the first video game. The first game object may be ported to the second video game to perform similar or different functions or to have similar or different effects in the second video game. In other words, a game object earned or acquired by the player in one video game may be ported to another video game to assist the player to cause similar or different effects or to perform similar or comparable actions or functions in the second video game. The porting is enabled by evaluating capabilities (e.g., power, influence, effects, actions, etc.) of the game object in the video game and translating those capabilities to comparable capabilities that are appropriate for the second video game and to identify a second game object to assign the comparable capabilities so that the second game object may be used to perform similar or different types of functions or produce similar or different effects in the second video game. The capabilities used to identify the second game object may be based on type of the game objects available in the second video game and context of a portion of the second video game in which the second game object is to be used.

A logic engine within a digital asset tracking engine may be used to identify the attributes of the first game object, map the attributes of the first game object earned and owned by the player in the first video game to comparable attributes that are appropriate for the second video game, and identify a second game object to assign the comparable attributes. A translation engine within the digital asset tracking engine is used to translate the attributes of the first game object in the first video game to the comparable attributes and assigns the comparable attributes to the identified second game object in the second video game. As previously stated, the matching of attributes takes into consideration a type of the first game object and type of influence (i.e., effect) the first game object had in the first video game, type of game objects available in the second video game and type of effect expected in the second video game. For example, the first game object may have been used to provide a certain amount of effect in a space shooter game. The attributes of the first game object used to exert the certain amount of effect in the space shooter game may be translated to comparable attributes, so that the game object that possesses these comparable attributes may be able to exert appropriate effect in an old west game or a car racing game. The mapping of the attributes thus takes into consideration types of game objects available in the different games, their functionalities, and the effects that the game objects can exert in the second video game. The comparable attributes identified in the second video game are assigned to the second game object identified in the second video game, so that the second game object has the capabilities to influence the desired effect in a portion of the second video game where the ported second game object is to be used. The second game object is associated with the player that initiated the porting. As part of assigning the comparable attributes to the second game object, the NFT associated with the digital asset earned or acquired in the first video game is updated to indicate the digital asset is now related to the second game object and to record use of the second game object in the history of use of the digital asset earned in the first video game. The attributes assigned to the second game object makes the second game object one-of-a-kind game object and only one player (i.e., the player who initiated the porting) in the second video game has possession of this one-of-a-kind second game object.

The player may have initiated the porting of the game object in the first video game to the second game object in the second video game in order to use it in achieving a significant event in the second video game. Consequently, use of the second game object is tracked and when the second game object is used in accomplishing the significant event within the second video game, an NFT associated with the second game object is updated. Further, a value is computed for the second game object used in accomplishing the significant event, based on the intrinsic value of the significant event, and the value is also updated to the NFT of the second game object. The use of the second game object is monitored continually and every time a significant event occurs in the second video game, the NFT of the second game object is updated by generating additional data blocks representing use data. As the second game object is used or traded or sold more within the second video game, the value of the second game object is incrementally updated to the metadata included in the NFT for the second game object. The enhanced value is used by the player during trading or selling.

The NFT concept used to keep track of the digital assets are thus extended to the context of video game to keep track of use of the game assets within the video game(s). As noted, the digital asset in the context of the video game may be a game object that can be used by players in the game or may be a "trophy" or a "golden ticket" or a "golden pass" awarded to allow the player access to additional game items or levels or entitlements that can be used in the video game. The digital asset may also be used by a player to increase their standing in the video game. The details included in the metadata provide history of use of the digital asset and the game asset's value. The value of the game asset and the NFT may be used during selling or trading of game assets by the player, and for monitoring use of the game asset in the video game.

In one implementation, a method for tracking game asset of a video game is disclosed. The method includes receiving game inputs provided by a player during gameplay of the video game. The game inputs are used to affect a game state of the video game. The game inputs of the player are analyzed to determine when a significant event occurs in the video game. The game inputs resulting in the occurrence of the significant event are used to earn a digital asset for the player, wherein the digital asset is usable in the video game. A non-fungible token (NFT) is generated for the digital asset earned by the player during gameplay. A value is computed and associated with the digital asset, wherein the value is indicative of an intrinsic value of the significant event. The NFT of the digital asset is associated with the player and is used to monitor use of the digital asset.

In one implementation, the digital asset earned by the player is associated with a descriptor identifying one or more attributes of the digital asset. The one or more attributes define capabilities of the digital asset that are usable during gameplay of the video game.

In one implementation, an option is provided to port the digital asset to a second video game. In response to the selection of the option, the porting of the digital asset to the second video game is initiated.

In one implementation, the porting of the digital asset to a second video game includes translating capabilities of the digital asset earned by the player in response in to the player accomplishing the significant event in the video game to comparable capabilities appropriate for the second video game. The translation is performed by mapping the one or more attributes included in the descriptor of the digital asset to one or more second set of attributes appropriate for the second video game. A second game object available in the video game is identified and the comparable capabilities appropriate for the second video game are assigned to the second game object for use in the second video game. The assigning results in the second game object adopting the one or more second set of attributes and assuming the value of the digital asset. The digital asset is a game object that was used to overcome challenges in the video game to accomplish the significant event.

In one implementation, the comparable capabilities assigned to the second game object correlate with a type of the second game object and context of a portion of the second video game where the second game object is to be used. The second game object is owned by the player or is automatically assigned to the player.

In one implementation, assigning the capabilities includes updating the NFT of the digital asset to include details of the second game object. The updating is indicative of the second game object being associated with the NFT. Responsive to assigning the capabilities, the digital asset in the video game is disabled and the second game object in the second video game is activated. The second game object is automatically associated with the player. The NFT of the digital asset is updated to record the transfer of the digital asset to the second game object. The updated NFT captures history of use of the digital asset in the video game and of the second game object in the second video game. The association of the second game object to the results in the player becoming an only owner of the second game object. The NFT is used to track use of the second game object in the second video game.

In one implementation, the use of the second game object in the second video game is tracked by assessing game inputs provided using the second game object in the second video game. When the game inputs provided via the second game object result in occurrence of a second significant event in the second video game, the NFT associated with the second game object is updated and the value of the second game object is incremented with intrinsic value of the second significant event.

In one implementation, the digital asset in the video game is a first key having capabilities to unlock a specific first game item or a specific level of the video game for gameplay. The specific level is identified based on current game level of the player in the video game. The second digital asset may be a second key having capabilities to unlock a specific second game item or a specific game level in the second video game for gameplay. The specific game level in the second video game is identified based on current game level of the player in the second video game.

In one implementation, the use of the digital asset earned by the player includes trading of the digital asset with select ones of other players of the video game. The trading is initiated in response to selection of an option for trading of the digital asset by the player and identification of the select ones of the other players of the video game to trade with. The select ones of the other players are identified from current gameplay session or from one or more prior gameplay sessions of the video game. The trading is initiated using the value associated with the digital asset. The video game, in this implementation, is a multi-player video game played between the player and other players.

In one implementation, when the select ones of other players are identified from one or more prior gameplay sessions, the option for trading is provided to the select ones of the other players in a social media post of the player. The select ones of the other players to trade with are identified to be social contacts or gameplay contacts of the player.

In one implementation, the value associated with the digital asset is computed based on intrinsic value associated with the significant event achieved by the player and game inputs provided by the player to overcome challenges when achieving the significant event. The value of the digital asset is adjusted based on amount of use of the digital asset in the video game.

In one implementation, the NFT is generated for the digital asset using a blockchain concept. The NFT for the digital asset includes a pointer to a storage location of the digital asset and a hash of the descriptor of the digital asset stored at the storage location. The point to the storage location and the hash of the descriptor are used to validate the digital asset stored in the storage location.

In one implementation, the digital asset is traded or sold using the value associated with the digital asset. The trading or selling is enabled by verifying that the digital asset being traded or sold is associated with the player and is in the storage location defined in the NFT, and upon successful verification, effectuating the trading or selling.

In one implementation, a system for monitoring use of a digital asset is disclosed. The system includes a game server configured to execute a game execution engine. The game execution engine is configured to instantiate a video game, in response to selection of the video game for gameplay by a player. The game server is further configured to execute a digital asset tracking engine that is communicatively connected to the game execution engine. The digital asset tracking engine is configured to receive game inputs provided by the player during game play; assess the game inputs to determine when the game inputs result in the player achieving a significant event, the game inputs provided for achieving the significant event result in the player earning a digital asset, wherein the digital asset is defined using a descriptor that identifies one or more attributes of the digital asset that define capabilities of the digital asset usable in the video game for overcoming challenges; and generate a non-fungible token (NFT) for the digital asset earned by the player and associate a value for the digital asset. The NFT of the digital asset is associated with the player and is used for trading and selling the digital asset. The digital asset tracking engine includes a logic engine and a translation engine. The logic engine is configured to interpret the one or more attributes included in the descriptor of the digital asset to identify capabilities of the digital asset; identify a second set of capabilities that are comparable to the capabilities and are appropriate to the second video game, the second set of capabilities identified by matching the one or more attributes of the game object to a second set of attributes appropriate for the second video game; and identify a second game object in the second video game for assigning the second set of capabilities. The translation engine is configured to translate the capabilities of the digital asset to the second set of capabilities of the second game object. The second set of capabilities of the second game object used to provide defined effect in a portion of the second video game, when used. The second set of capabilities are assigned to the second game object. The assigning results in the second game object being assigned to the player and the second game object adopting the second set of attributes and assuming the value of the digital asset.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

Figure 1:
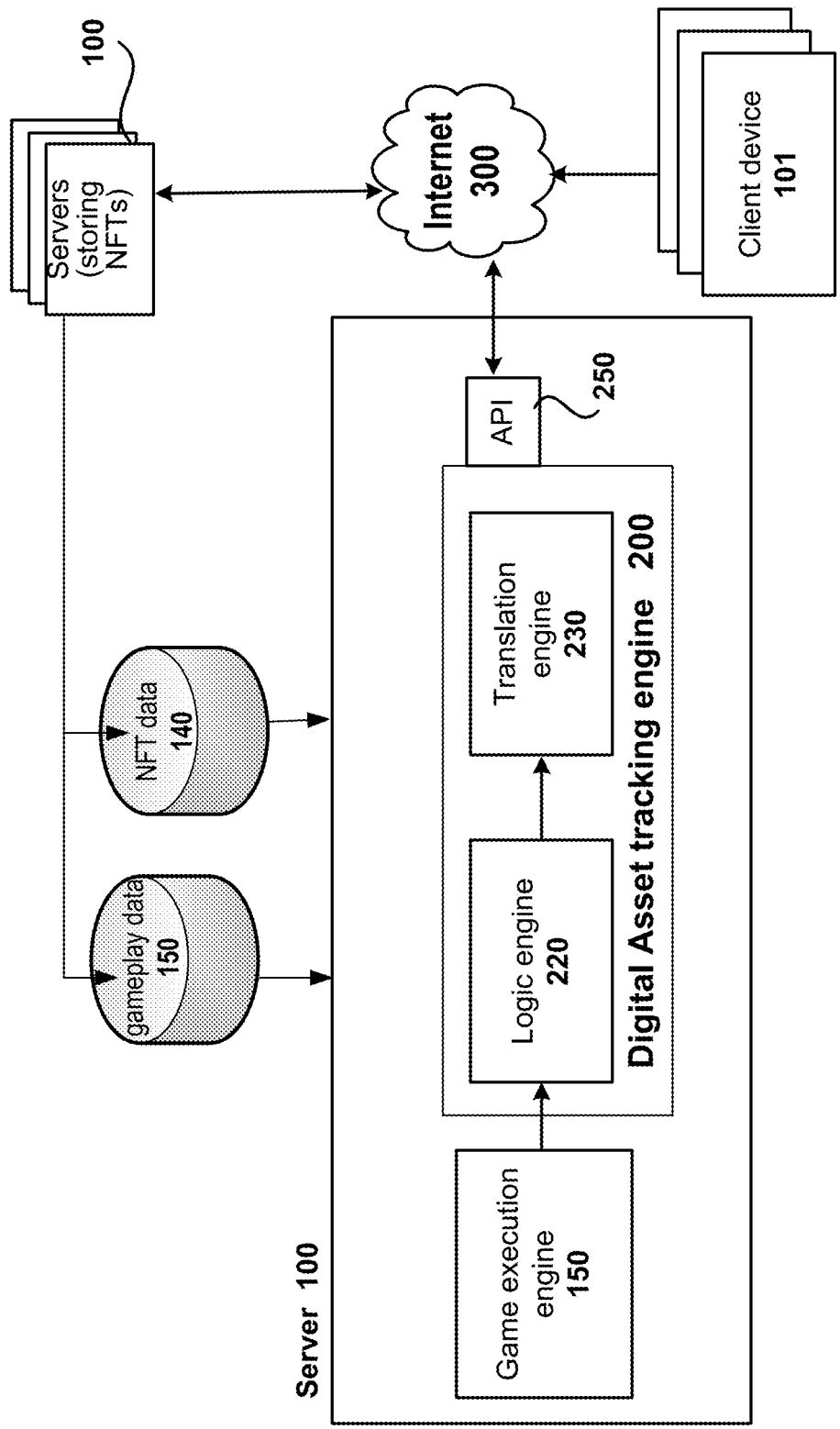
FIG. 1 illustrates an example of an overly simplified block diagram of a game execution engine in communication with a digital asset tracking engine used in tracking a digital asset used in a video game, in accordance with one implementation of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Blockchain technology is growing in popularity as it provides a way to have secure digital transactions between two parties without requiring a third party. The blockchain technology maintains an automated digital ledger recording each and every digital transaction. The blockchain representing the various transactions of a digital asset are represented using a non-fungible token (NFT). The NFT for a digital asset is used to validate the digital asset by verifying authenticity, past history, and past and present ownership of the digital asset. The blockchain of the digital asset is stored on multiple servers and used to further authenticate the digital asset by ensuring that the data contained in the blockchain for the digital asset on one server is same as the blockchain data contained for the digital asset on majority of servers.

The concept of tracking and authenticating a digital asset using NFT generated using blockchain technology is extended to tracking and authenticating digital assets used in video games. The digital assets used in the video games are also referred to herein as game assets or game objects. NFT data is generated for each game asset available in the video game. The NFT data of a game asset maintains a history of use of the game asset using the blockchain concept. The use of the game asset in the video game is monitored and when it is determined that the game asset was used to achieve a significant event, a distinct block capturing details of such use is generated for the game asset and added to the blockchain. Maintaining details of use of the digital asset in significant events may be to keep the cost of maintaining the NFT low. The NFT maintained for the game asset provides sufficient details for verifying the authenticity of the game asset, provides past use history, past/present ownership of the game asset, attributes possessed by the game asset, and attributes of the game asset used in the video game to achieve one or more significant events. When the game asset is acquired by another player, the ownership of the game asset is automatically updated to the NFT of the game asset using a new block. In some implementations, only some of the game assets used in the video game have NFTs associated with them. In such implementations, the NFTs are generated for the game assets based on their usage in qualified significant events in the video game. In alternate implementations, each game asset used in the video game may have an NFT associated with them to begin with and based on their usage in qualifying events, the NFT of the game asset may be updated.

The NFT provides history of use of the game asset of not only of the player that is currently owning the game asset but also of other players who possessed the game asset during current or prior gameplay sessions of the video game. Specifically, the NFT keeps record of ownership, qualifying game event (i.e., significant event) in which the game asset was used, type of activity performed using the game asset (e.g., defeating the monster, escaping from the dungeon, killing a virtual character, etc.), and/or the action(s) that were performed using the game asset (e.g., various types and number of moves performed, etc.), etc. In addition to using the game asset in the video game, the game asset may be sold or traded with other players in the video game.

In some implementations, the game asset earned by a player in a video game may be ported to a second video game and such porting may be done based on explicit instructions from the player owning the game asset. The porting of the game asset may be done by identifying capabilities of the game asset used in accomplishing the significant events, identifying comparable capabilities that are appropriate in the second video game, identifying a second game object and assigning the capabilities to the second game object. The assigning of capabilities to the second game object may be accomplished by updating attributes of the second game object so that the updated attributes of the second game object provide the capabilities that are appropriate in the second video game for accomplishing significant events or other tasks.

The historical use information provided in the NFT for the game asset may be used to assign a value for the game asset. The value computed for the game asset may be indicative of an intrinsic value of the significant events in which the game asset was used and/or the demand or desirability expressed by the other players in owning the game asset. In one implementation, the significant event is defined as an event that is rare or very infrequent in occurrence and may result from the player performing one or combination of, specific maneuvers or specific combination of maneuvers that were not performed before, achieved within an amount of time that was not done before, or achieved by a young or inexperienced player, to name a few. Consequently, when a player achieves such significant event(s) during gameplay, the value of the game asset used when achieving the significant event may be computed to reflect the intrinsic value of the significant event. As the game asset is used to achieve more and more of such qualifying events, the value of the game asset is incrementally increased. The NFT is updated with the information related to the qualifying events and the current value of the game asset. In addition to computing the value of the game asset from its use in the qualifying events, the value may also be computed when the game assets are traded or sold to other players. The value computed from trading or selling of the game asset is based on the frequency of such trades or sales, which reflect the popularity or desirability of the game asset among the other players. The intrinsic value of the game asset obtained from the NFT can be used by all the players (including the player) to make strategic decisions during gameplay including whether to keep or trade or sell or obtain the game asset, and once acquired, when, where and how to use the game asset during gameplay, etc. The game asset may also be obtained or retained by the player or another player as a collectible item, due to the game asset's unique history recorded in the NFT. Collecting the game asset may result in the player having an improved standing in the video game. In some implementations, the digital assets with associated NFTs owned by a player may be visually presented alongside the avatar or virtual character representing the player, or may be presented in the player's profile, or may be provided in a leader-board alongside an image representation of the virtual character or avatar of the player. The visual presentation may be provided to indicate the standing of the player in the gaming world, for example.

FIG. 1 illustrates a broad overview of a system used for tracking use of a game asset used within a video game, in one implementation. A player may select a video game for gameplay. The selected video game may be a single player video game or a multi-player video game. When the video game is a multi-player video game, the selection of the video game may be received from more than one player at any given time. Responsive to the selection of the video game for gameplay, an instance of the video game is instantiated by a game execution engine 150 executing on a server 100. The server 100 may be a cloud game server that is part of a cloud gaming site (not shown). The player interacts with the video game by providing game inputs from a client device 101 and the game inputs are communicated to the video game executing on the server via network 300, such as Internet. The video game executing at the game execution engine 150 uses the game inputs to affect a game state of the video game and generates game data, which is sent back to the client device 101 for rendering.

Game inputs provided by the player and game state of the video game are provided as inputs to a digital asset tracking engine 200 executing at the server 100 to track use of various game assets used during gameplay of the video game. The digital asset tracking engine 200 analyzes the game inputs of the player to identify the game assets that were used to provide the game inputs during gameplay and the effects of the use of the game assets in the video game as defined by the game state. The digital asset tracking engine 200 may use the time and space attributes of the game inputs to correlate the game inputs of the player to outcomes in the video game and the appropriate game assets used to provide the game inputs for the video game.

The use of the game asset in the video game is continually tracked by the digital asset tracking engine 200. When the game asset is used to achieve a significant event within the video game, the digital asset tracking engine includes the logic to generate a non-fungible token (NFT) with details of the significant event and associate the NFT to the game asset, when no NFT is associated with the game asset, and when there is an NFT associated with the game asset, the NFT of the game asset is updated with details of the significant event. The NFT of the game asset is associated with the player who provided the game inputs to achieve the significant event. There are many types of game events that are defined to occur in the video game during gameplay. These game events may be defined by game developer(s), game sponsors, game distributors, or by players. Some of the game events are designated as significant game events due to their frequency of occurrence, level of difficulty of achieving, etc. By way of example, a score achieved by a player may be higher than all other scores that were achieved previously by other players in the video game. In this case, the scoring of the higher score becomes a significant event. In another example, the event may have been achieved in shortest possible time ever recorded in the history of gameplay captured for the video game, or the event was achieved by the youngest player or the least experienced player. Logic is provided in the digital asset tracking engine 200 to identify the types of significant game events that can occur and for identifying a significant event when it occurs in the video game.

When the game inputs provided by the player using the game asset (i.e., game object) result in a significant event occurring in the video game, the digital asset tracking engine 200 may award a digital asset to the player. The digital asset awarded to the player may be a "golden key" or a "golden pass" with capabilities to unlock a certain game item or a certain level in the video game, or may be a "trophy" that can be used to avail special privileges in the video game. The digital asset earned by the player may be used in the video game during gameplay or traded or sold to other players. The NFT for the digital asset is minted using blockchain technology, wherein the blockchain may be part of a public ledger, such as an Ethereum blockchain, or may be part of a private ledger (i.e., private blockchain. The Ethereum blockchain, by its very nature, maintains the data on different servers in a manner that the data cannot be manipulated or tampered with. In other words, the data generated in the Ethereum blockchain is unchangeable and tamper-proof In some implementations, the private blockchain may be specific to gaming system. The gaming system may encompass a plurality of video games (including the video game for which the NFT is being created) that are hosted on a single gaming platform or on different gaming platforms. The private blockchain may establish standards and rules (e.g., similar to the Ethereum blockchain) for writing into the blockchain when minting or updating the NFT for different game assets/game objects and for sharing the NFT and certain ones of data in the blockchain with other video games hosted on different platforms. The data included in the blockchain for the digital asset is metadata (i.e., digital descriptor) that provides sufficient details related to the digital asset including an asset identifier, a video game identifier of the video game where the digital asset was awarded/earned/acquired, player identifier, type, attributes defining capabilities, entitlements, functionalities, number and type of significant events in which the digital asset was used, frequency of trade or sale (if any), etc. In order to determine the frequency of trade or sale, a counter may be kept to keep track of the trade or sale.

A logic engine 220 within the digital asset tracking engine 200 is configured to identify the use of the digital asset (i.e., game asset) earned by the player in the video game, identify the attributes of the digital asset, defining capabilities possessed by the digital asset in the video game, and correlate the capabilities of the digital asset in one video game into comparable capabilities in a second video game, when a request is received for porting the digital asset earned in one video game to another video game. In one implementation, comparable capabilities are defined as capabilities that are known to provide an effect in the second video game that is at least to a level or extent of effect that was provided in a first video game using the digital asset with the capabilities that were used to identify the comparable capabilities. Once the comparable capabilities are identified in the second video game, a translation engine 230 may be used to translate the one or more attributes included in the metadata of the digital asset to comparable second set of attributes that is appropriate in the second video game. More details with reference to porting of the digital asset will be discussed in detail with reference to FIGS. 2-4. Use of the digital asset within the video game and in other video games, when ported, are tracked and recorded in the NFT. The NFT of the digital asset is stored in NFT data datastore 140 that is maintained on different servers 100 accessible via a network 300, such as the Internet. The game inputs provided by the player during gameplay of the video game are stored in gameplay datastore 150. The blockchain technology used in maintaining the NFT and, where available, standards established to write to the NFT provides the ability to keep track of a complete history of use of the digital asset even when the digital asset is ported to other video games executing on different gaming platforms.

Figure 2:
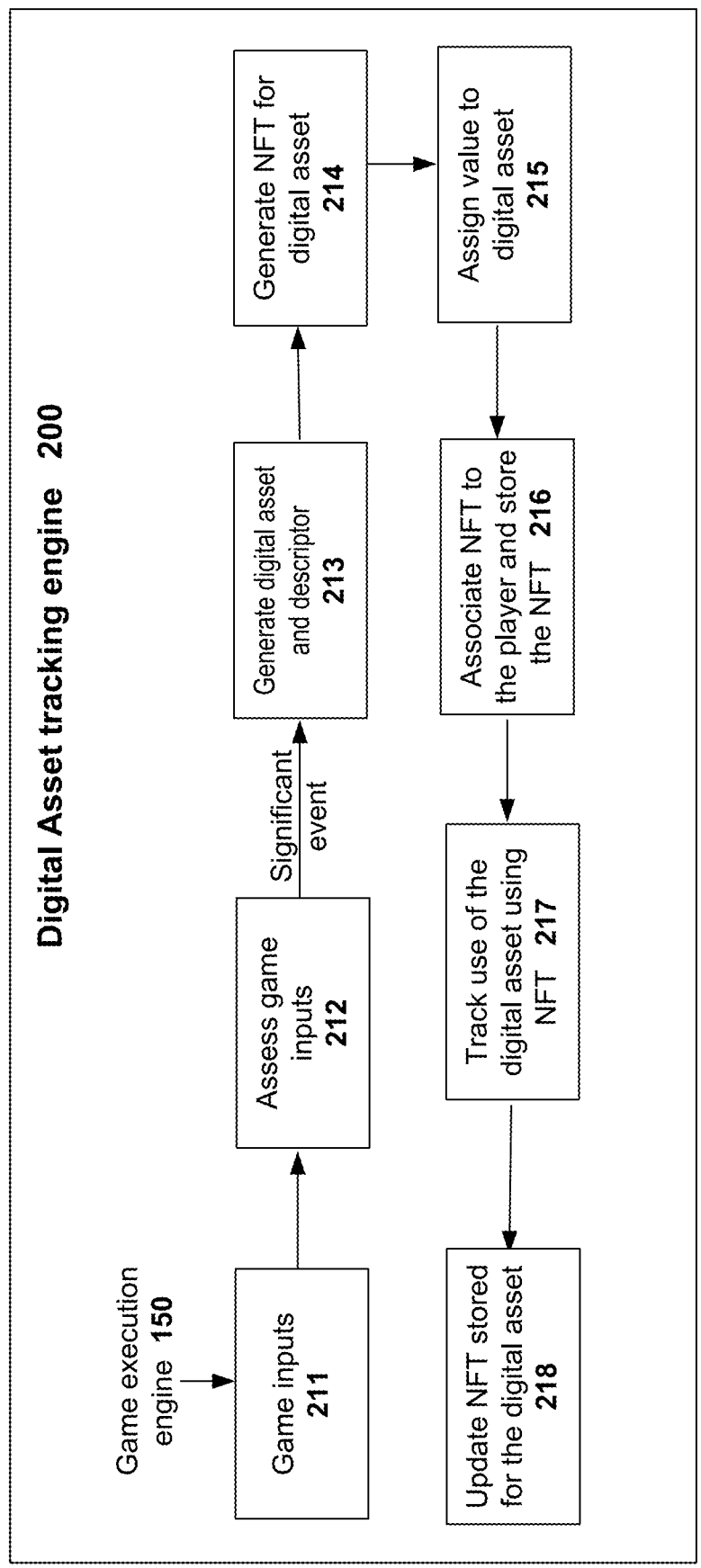
FIG. 2 illustrates an example data flow within the digital asset tracking engine used in tracking a digital asset used in a video game, in accordance with one implementation of the present disclosure.

FIG. 2 illustrates an example flow of data implemented in the digital asset tracking engine 200 during tracking of use of a game asset in a video game, in one implementation. The game inputs, as illustrated in block 211, provided by the player during gameplay of the video game are provided by the game execution engine 150 as inputs to the digital asset tracking engine 200. The game inputs are assessed, as illustrated in block 212, to determine if the game inputs provided by the player result in the occurrence of a significant event defined for the video game. If the game inputs result in the occurrence of the significant event, a digital asset is generated, as illustrated in block 213, and awarded to the player in recognition of the player achieving the significant event. The generation of the digital asset includes generating a digital descriptor, as illustrated in block 213, of the digital asset detailing the digital asset's attributes. The attributes define the capabilities, the functionalities and the entitlements of the digital asset. In addition to generating the digital asset, an NFT is generated for the digital asset, as illustrated in block 214. The NFT is generated using blockchain technology and the metadata for the digital asset in the NFT includes the details from the digital descriptor.

The digital asset is accorded a value. The value of the digital asset is computed as a function of the intrinsic value of the significant event that resulted in the player earning the digital asset. In one implementation, the intrinsic value of the significant event is predefined by a video game developer or a video game sponsor or a video game host or by one or more players and is based on the frequency of occurrence of the significant event. After awarding the digital asset, the use of the digital asset is tracked using the NFT. As and when the digital asset is used to achieve additional significant events, the value of the digital asset is adjusted upwards. The value computed for the digital asset reflects the asset's capabilities when used in the video game. The incremented value of the digital asset and details of the additional significant events are updated to the NFT of the digital asset.

The NFT generated for the digital asset is associated with the player and stored, as illustrated in block 216, in the NFT data datastore 140 maintained on a plurality of servers. Use of the digital asset is tracked, as illustrated in block 217. The digital asset may be used by the player within the video game, or may be offered for sale or trade to other players for use in the video game, or may be ported to a different video game. The digital asset may be offered for sale or trade based on the value computed for the digital asset. The value that is computed is indicative of the contribution of the digital asset in the video game, for example. Consequently, the greater the contribution of the digital asset, the greater the value assigned to the digital asset. This, in turn, could translate to greater demand for the digital asset from other players. The value of the digital asset is updated to the NFT associated with the digital asset, as illustrated in block 218, and stored in the NFT data datastore 140 for subsequent use/retrieval. In some implementations, the digital asset and its achievements/value may be retrieved and presented using visual indicators alongside content of video game or alongside avatar or virtual character representation of the player or on a leader-board or in some portion of the display screen to inform other players of the presence of the digital asset and its intrinsic value. In some implementations, the presentation of the digital asset may be to brag or inform other players of the player possessing the digital asset. The visual indicators may be customized in accordance to the value of the digital asset. In some implementations, the digital assets may be presented in the form of numbers/scores, or color coded, or represented in graphical user interface format, etc.

As the digital asset earned in the video game is used within the video game, or traded or sold to other players for use in the video game, or is ported to other video games, the NFT of the digital asset is updated. For example, when the digital asset is traded or sold to other players, the NFT of the digital asset is updated to record change in ownership of the digital asset. The other player(s) use of the digital asset is recorded to build the use history of the digital asset. The value of the digital asset is computed in accordance to the digital asset's use in the video game or in other video games, and the amount of use is indicative of the demand or desirability of the digital asset to other players. The use history of the digital asset provides information that can be used by the players in the video game to keep track of the digital asset, to strategize their gameplay in the video game, and/or to improve their standing in the video game.

Figure 3:
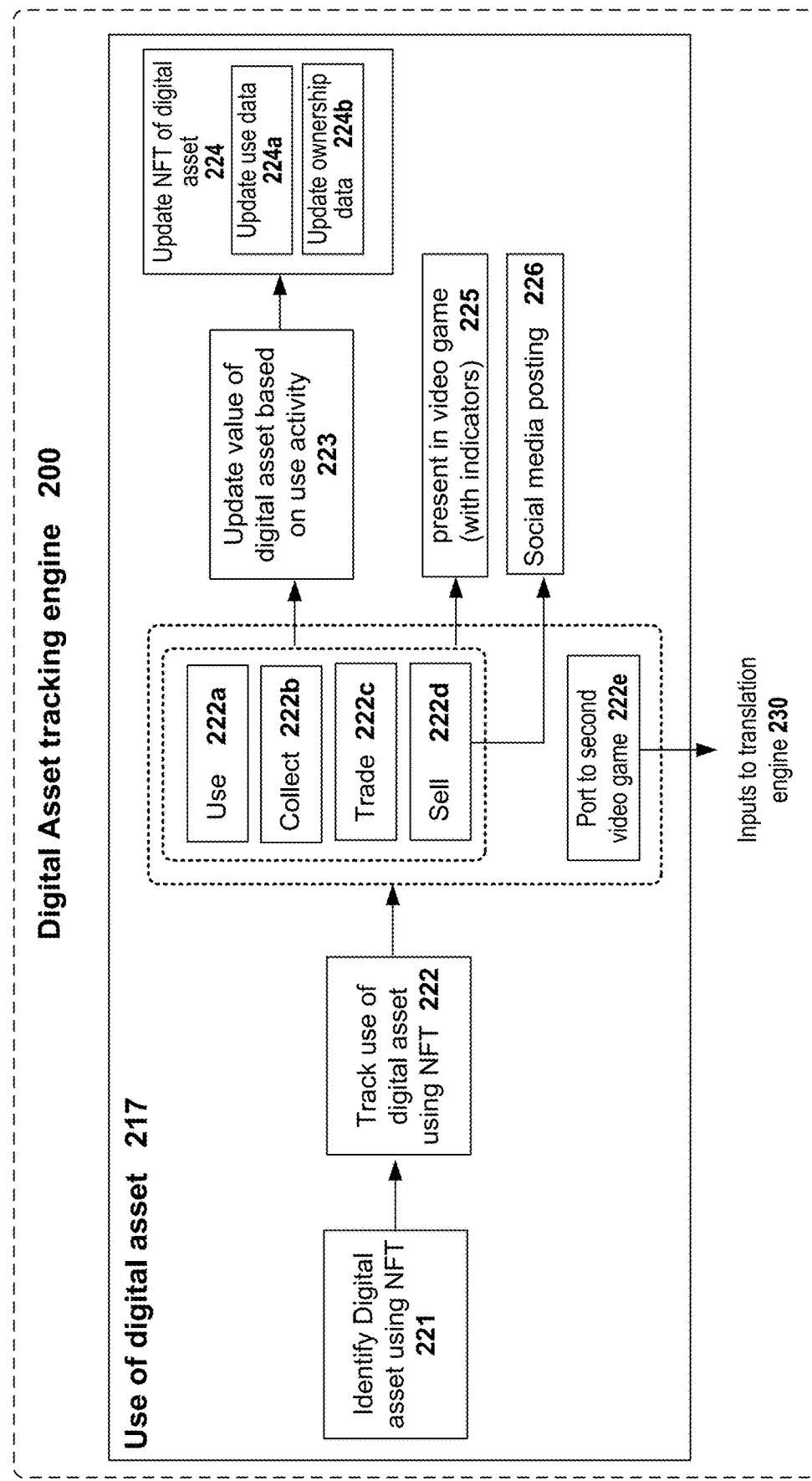
FIG. 3 illustrates an example of tracking result of use of the digital asset in the video game, in accordance with one implementation of the present disclosure.

FIG. 3 illustrates data flow from tracking use of the digital asset in the video game, in accordance with one implementation. As noted above, the digital asset tracking engine 200 tracks use of the digital asset earned by the player during gameplay of the video game. The digital asset may be a game object or may be a trophy or golden key or golden pass or golden item awarded to the player to provide special privileges to the player, such as unlocking a specific game item/game object or specific game level. The digital asset may be used (222a) to provide game inputs in the video game, or collected (222b), or traded (222c) or sold (222d) to other players, or ported (222e) to other video games. In one implementation, the digital asset may be collected by the player for elevating their status in the video game. Identity (221) of the digital asset is used to track (222) use of the identified digital asset. When the use (e.g., game actions) of the digital asset (e.g., a game object) results in the player achieving a significant event, the value of the digital asset (i.e., represented by the game object) is updated, as illustrated in block 223, in accordance to the intrinsic value of the significant event achieved using the digital asset (222a). The intrinsic value of the significant events that can occur in the video game may vary based on frequency of occurrence of such events in the video game. For example, the value for achieving a high score in the video game may be less due to the fact that the occurrence of such event may be more frequent (e.g., high score achieved by one player may be topped by another player). In another example, the value for completing a level in the shortest period of time by a player may be less due to the fact that another player may be able to beat the player's time. However, a player scoring the highest runs in a baseball game or scoring highest number of field goals in football may be a rare occurrence. Frequency of such achievements may be further affected when other attributes of the player, such as the age of the player (e.g., youngest or oldest), experience of the player (e.g., rookie player), etc., are taken into consideration and the intrinsic value of the significant event is computed accordingly. The updated value of the digital asset and use data related to the significant event achieved by the player using the digital asset are updated to the NFT (224a) associated with the digital asset, as illustrated in block 224.

As noted, the game inputs may include an unlock action provided by the player. The unlock action may be provided by the player on a user interface (e.g., a pop-up window or a side window) rendered alongside the gameplay data. In response to the selection of the unlock action, the user interface may provide options to select a game item from a list of game items or a game level from a list of game levels that the player is eligible to unlock. The list of game items or game levels available to the player for unlocking may be based on the current level of the player, current standing of the player in the video game, and context of the game scene where the player is currently located and interacting in the video game. When a game item is unlocked, the use of the game item in the video game is monitored and when the unlocked game item is used to achieve a significant event, the value of the digital asset is incremented (as illustrated in block 223) and the use data is updated to the NFT of the digital asset, as illustrated in block 224*a*.

In some implementations, the digital asset may be acquired as a collectible item, as illustrated in block 222*b*. The digital asset (e.g., a trophy) may have been awarded to the player in response to the player achieving a significant event (e.g., $100^{th}$ field goal in football or $50^{th}$ field goal achieved by a single player of a team, or $1000^{th}$ run in baseball, etc.), and the digital asset may have an intrinsic value based on the rarity of the significant event achieved by the player. Due to the rarity of the significant event, the digital asset may be retained as a collectible item. Irrespective of the ways the digital asset is used, the value of the digital asset is incremented, as illustrated in block 223, and the value and use data is recorded in the NFT associated with the digital asset, as illustrated in block 224*a*.

The digital asset may be traded, as illustrated in block 222*c*, to other players in the video game. The player may trade the digital asset for another digital asset or game object owned by another player. The offer to trade the digital asset may be provided to select ones of other players, wherein the select ones of other players may be members of the same team as the player offering the digital asset for trade. Alternately, the digital asset may be offered for trade to other players who are participating in a current gameplay session of the video game or who participated in prior gameplay sessions of the video game. The trading of the digital asset is based on the value of the digital asset, which may be based on the number and type of significant events that were achieved using the digital asset or using game item unlocked by the digital asset. The offer for trade to other players in the current gameplay session may be provided in a chat interface, in a pop-up window or a user interface rendered alongside the gameplay data. Alternately, the offer for trade may be presented in a social media post. In this case, the offer for trade may be extended to the other players from prior gameplay sessions. When the digital asset is successfully traded, the value of the digital asset may be incremented to reflect the trade, wherein the value corresponds to demand of the digital asset as reflected in the interest of the other player(s) in acquiring the digital asset. As the digital asset gets traded more and more, the value of the digital asset may correspondingly be incremented. Further, the NFT of the digital asset is updated to indicate change in ownership of the digital asset, as illustrated in block 224*b*.

In some implementations, the digital asset may also be sold, as illustrated in block 222*d*, to other players in the video game. As with the trade, the selling of the digital asset is based on the value of the digital asset. The digital asset may be offered for sale to select ones of other players who are in the same team as the player owning the digital asset or to players of the current gameplay session or players of prior gameplay session. The digital asset may also be sold in the "open market" for any player interested in owning the digital asset for use in the video game. The sale of the digital asset may result in the value of the digital asset being marginally incremented (as illustrated in block 223) to reflect the demand of the digital asset. The sale also results in the NFT of the digital asset being updated to indicate change in ownership of the digital asset, as illustrated in block 224*b*.

As noted, the digital asset earned by the player may be visually presented, as illustrated in block 225 in a graphical form (graphical icons, images, etc.,) alongside an image representation of the player in a user interface rendered alongside the gameplay content of the video game to inform other players of the digital assets earned or acquired by the player. In some implementations, the significant events for which the digital asset was earned or in which the digital asset was used may also be identified and rendered alongside the graphical representation of the digital asset to inform other players the value and the significance of the digital asset. The details related to the digital asset may be obtained from the metadata included in the NFT associated with the digital asset. The details of the digital asset presented in the user interface may be used by other players to make informed decision on selling, trading, collecting or acquiring the digital asset. In alternate implementations, the details related to the digital asset earned by the player may be presented in a social media post 226. The social media post may be provided as a bragging post to other players highlighting the player's achievements or standing in the video game, or may be to promote the digital assets for sale or trade.

In addition to the aforementioned use of the digital assets (e.g., for use, sale, trade, or collect) in the video game (i.e., first video game), the player may elect to port the digital asset to a second video game, as illustrated in block 222*e*. The second video game may be running on the same platform as the video game or may be running on a different platform. The player may express their interest in porting the digital asset to the second video game by selecting a porting option from a user interface rendered alongside the gameplay content at the display screen of the client device 101 of the player. Selection of the option to port the digital asset earned in the first video game to the second video game initiates the porting operation. Details of porting the digital asset earned or acquired by the player in the first video game to the second video game will be described in detail with reference to FIG. 4.

Figure 4:
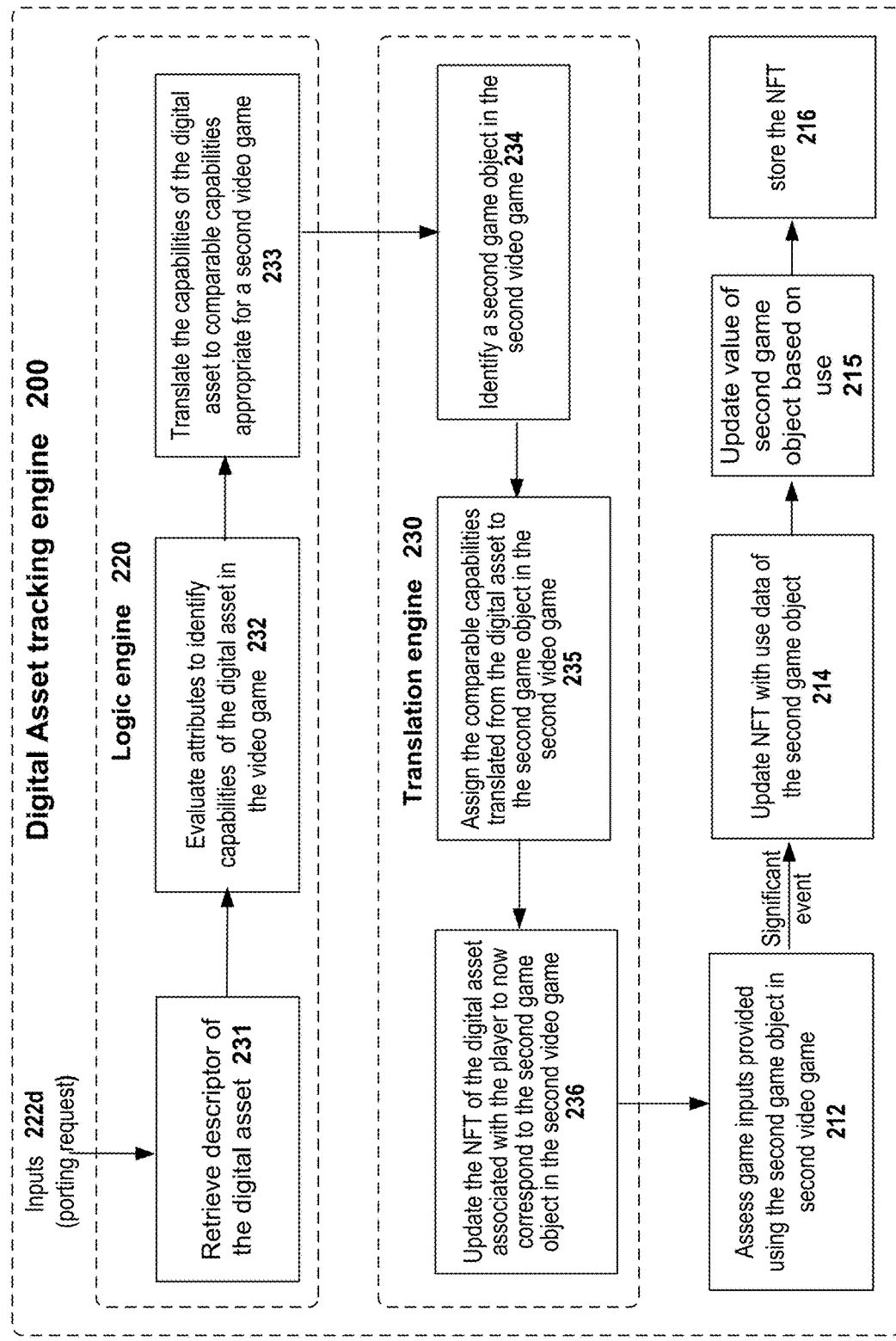
FIG. 4 illustrates an example data flow within the different modules of the digital asset tracking engine, in accordance with one implementation of the present disclosure.

FIG. 4 illustrates the flow of data involved in successfully porting the digital asset earned or acquired by the player in a first video game to a second video game, in one implementation. A porting of the digital asset from the first video game to a second video game is initiated in response to a porting request received at the logic engine 220 of the digital asset tracking engine 200. The porting request may have been selected by a player from a user interface either during gameplay or after gameplay of the video game. The digital asset selected for porting may have been earned by the player in response to the player achieving a significant event (e.g., scoring the highest number of field goals in the history of football or scoring highest number of runs in baseball, etc.) during gameplay of the video game or may have been acquired by the player as part of sale or trade with another player.

Responsive to receiving the porting request of the digital asset, the logic engine 220 queries the NFT data datastore 140 and retrieves a descriptor of the digital asset, as illustrated in block 231. The descriptor of the digital asset includes details of the digital asset including video game identifier and player identifier associated with the digital asset, the significant event(s) that the digital asset was used in or was earned by the player, and the attributes of the digital asset. The attributes define the capabilities, the entitlements, functionalities, etc., of the digital asset that can be used in video game. The attributes of the digital asset are evaluated, as illustrated in block 232, to identify the capabilities of the digital asset, the entitlements that are granted to the digital asset, various functionalities the digital asset is capable of providing, etc., as illustrated in block 233, which can be put to use in different scenarios within the video game. The identified capabilities, functionalities and/or entitlements possessed by the digital asset in the video game are then used to identify comparable capabilities, functionalities and entitlements that are appropriate in the game scenes of the second video game. For example, the digital asset may have the capability or capacity to inflict certain amount of damage in a space shooter game. In one implementation, the digital asset associated with the first video game may be a game object that was earned or acquired either through purchase or trade by the player and used to generate certain effect in the first video game (i.e., certain amount of damage in the space shooter game). The logic engine is used to translate the capabilities or capacities possessed by the digital asset (e.g., cause the certain amount of damage) in the space shooter game to comparable capabilities that are needed to cause a certain effect in an old west game or a car racing game or a basketball game. In one implementation, the translation of the capabilities from the first video game to the second video game may be based on at least type of digital asset (e.g., weapons or other game objects) used in the first video game, context of the portion of the first video game where the digital asset was used, effects experienced in the portion of the first video game as a result of use of the digital asset, type of game objects available in the second video game, context of a portion of the second video game where a second game object is to be used, and effects expected in the portion of the second video game when the second game object is used. The translation of the capabilities is performed by mapping a first set of attributes of the digital asset included in the descriptor of the digital asset to comparable second set of attributes identified to be appropriate for the second video game. The second set of attributes defining the comparable capabilities as translated by the logic engine 220 is then provided as inputs to the translation engine 230.

The translation engine 230 uses the second set of attributes defining the comparable capabilities to identify a second game object available in the second video game, as illustrated in block 234. The second game object may or may not be owned by the player in the second video game. The translation engine 230 then assigns the second set of attributes so that the second game object has the comparable capabilities for use in the second video game, as illustrated in block 235. In one implementation, the assigning of the second set of attributes includes assigning ownership of the second game object to the player. In this implementation, the second game object is not owned by or associated with any other player but is available within the second video game for acquiring. As a result, assignment of ownership to the player results in the player being the only one in the second video game to possess ownership of the game object with the specific capabilities that may be needed to provide a desired effect in the second video game, which may result in the occurrence of a significant event. In another implementation, the second game object may be owned by the player. In this implementation, the second game object may not have all the capabilities or the extent of capabilities that are identified from assessing the digital asset. As such, the assigning of the attributes to the second game object owned by the player in the second video game would result in the second game object acquiring comparable capabilities identified from assessment of the attributes of the digital asset. In one implementation, the porting request from the player may also include identity of the second game object in the second video game to transfer the digital asset.

In one implementation, the assignment of the attributes and adjustment to ownership is done automatically without requiring player input, and is done in response to the request to port the digital asset from the first video game to the second video game. In one implementation, as part of porting the digital asset earned or acquired in the first video game to the second game object in the second video game, the second game object assumes the value defined for the digital asset in the video game. In one implementation where the player is not the owner of the second game object, the assignment of the second set of attributes and update of the ownership in the NFT to the player may be performed in exchange for some nominal game points or game currencies or cryptocurrencies identified in the user profile of the player. The nominal exchange may be initiated in order to satisfy requirements of gaming platforms on which the first video game and the second video game are executing or based on standards set within the different video games. In some cases, the requirements of the transfer from one gaming platform to another may be different, and in order to adhere to the respective gaming platform requirements, the transfer may be effectuated by the player foregoing certain amount of game points or game currencies or cryptocurrency in the second video game, assuming that the player has some currencies or game points in the second video game. The amount of game points or game currencies may be determined based on the value associated with the digital asset.

In addition to assigning the second set of attributes and ownership of the second game object to the player and as part of porting the digital asset, the translation engine 230 updates the NFT of the digital asset associated with the player to now correspond with the second game object, as illustrated in block 236. The updating of the NFT allows the use history of the digital asset to transfer to the second video game so as to allow continued tracking of use of the digital asset by now tracking use of the second game object in the second video game.

In one implementation, as part of porting the digital asset from the video game to the second game object in the second video game, the digital asset is disabled in the video game to indicate that the digital asset is no longer available to the player in the video game. Simultaneously, the second game object identified in the second video game is activated and the updates to the NFT indicate that the digital asset now corresponds to the second game object in the second video game, and the use of the digital asset will now be tracked by tracking use of the second game object in the second video game. Further, the updates to the NFT will also indicate that the second game object in the second video game is now associated with the player. This might be the case if the second game object in the second video game is not owned by the player.

Game inputs provided by the second game object in the second video game are tracked and assessed by the digital asset tracking engine 200, as illustrated in block 212. When the game inputs result in occurrence of a significant event in the second video game, the NFT associated with the second game object is updated with the details of the significant event of the second video game, as illustrated in block 214. As the second game object was used to achieve significant event in the second video game, the value of the second game object is enhanced and the value is updated to the NFT, as illustrated in block 215. The updated NFT for the second game object is stored in NFT data datastore 140, as illustrated in block 216. The updated NFT provides use history of the digital asset in the first video game and the corresponding use of the second game object identified for the digital asset in the second video game. In one implementation, the digital asset earned in the first video game may be a first key having the capability to unlock a specific game item in the first video game or a specific game level in the first video game. The specific game level may be identified based on current game level of the player in the first video game. In one implementation, the second game object may be a second key having the capability to unlock a specific second game item or a specific game level in the second video game. As with the first video game, the specific game level in the second video game may be identified based on current game level of the player in the second video game.

The continuance tracking of use of the digital asset in the first and the second video games provides players of the two video games a full history of use of the digital asset. The two video games may be executing on a single gaming platform or on two different gaming platforms and the NFT generated for the digital asset is used to keep track of use of the digital asset in multiple video games in the same or across different gaming platforms. The history of use can be used by players to strategize on the game objects to keep, give away, collect, sell or trade, and game objects to use in specific situations within the different game scenes of the video game.

It should be noted that the NFT is created and maintained for game objects that are used only in significant events. As creation and/or updating of the NFT to a blockchain technology takes time and resources, it is more efficient and useful if the NFT is recorded for use of the game asset in qualifying events (i.e., significant events) rather than for each and every event occurring in a video game. The NFT generated for a digital asset, such as the game object, includes a pointer to a storage location where the game object is stored and a hash of the descriptor defining the attributes of the game object. The pointer and the hash are used to validate the storage location and content in the storage location (i.e., the game object) prior to initiating updates to the NFT, and prior to initiating sales, trades, or buys of the game object. Additionally, the sale or trade of the digital asset is initiated using the intrinsic value of the game object, which is based on the use and/or demand of the game object.

The first video game may be executing on a first server (e.g., a first proprietary platform designed to execute the first video game and provides the necessary resources) and the second video game may execute on a second server (e.g., a second proprietary platform designed to execute the second video game and provides the necessary resources). The NFT is generated using metadata that is standardized for use across different platforms so that portability of a digital asset between video games executing on different platforms can be enabled. An API may be used to communicate the metadata included in the NFT of a game asset so that the metadata of the NFT can be stored on different servers and retrieved for porting the game asset to different video games executing on different platforms. The API may also be used to communicate the game selection requests (e.g., first video game executing on first platform, second video game executing on a second platform, third video game executing on the first platform, etc.), game inputs provided by the player during gameplay of the selected game, and game data, game state of the selected video game to client devices of the player over network, such as the Internet.

Figure 5:
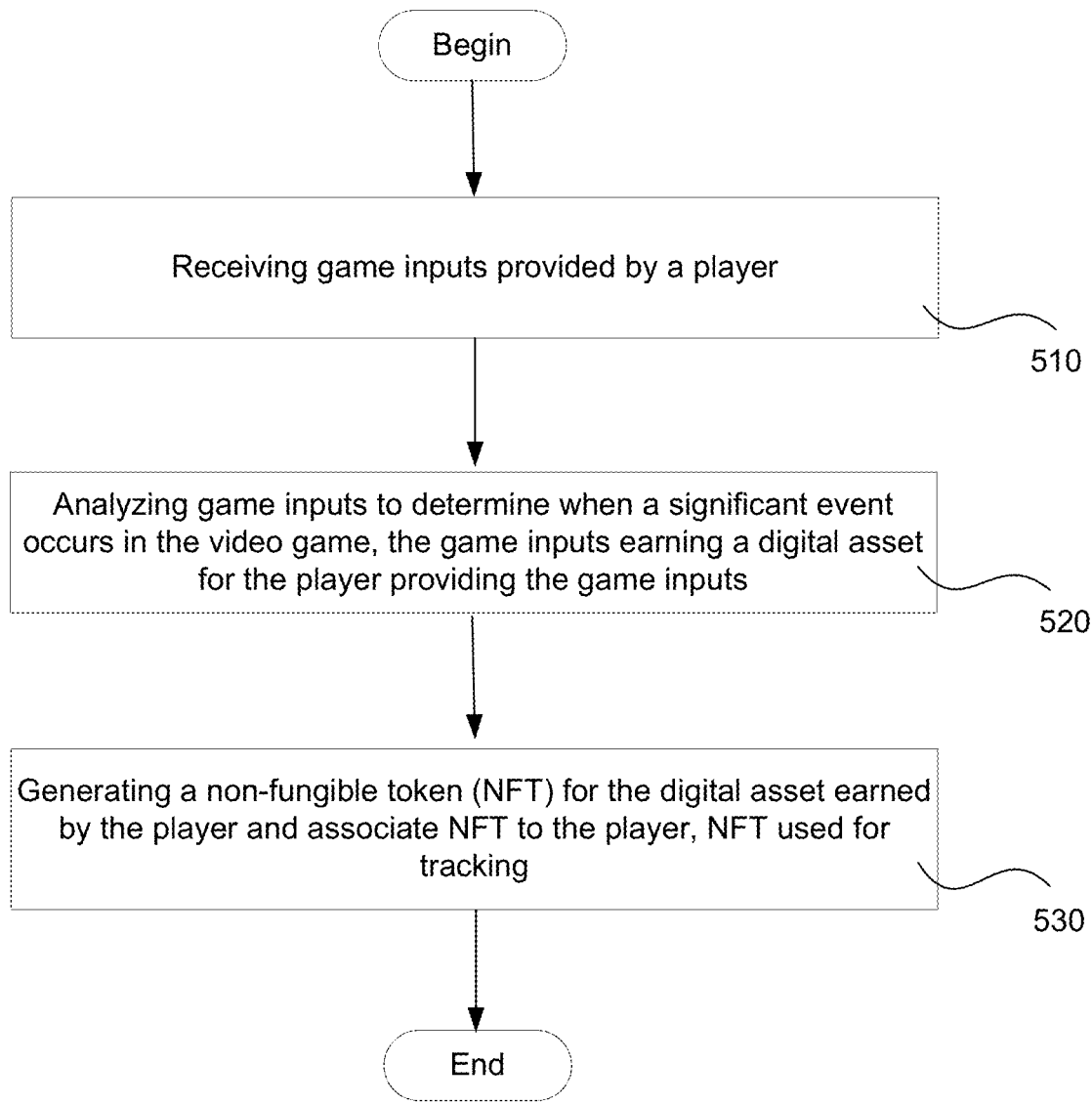
FIG. 5 flow operations of a method used for tracking digital assets using NFTs, in accordance with one implementation of the present disclosure.

FIG. 5 illustrates various flow operations of a method for tracking use of a game asset in a video game, in one implementation. The method begins at operation 510 wherein game inputs provided by a player during gameplay of a video game are received at a digital asset tracking engine. The video game may be a single player game or a multiplayer video game. Further, the video game may be an online game, or a console game that is not online, or may be streaming video game. The game inputs may be provided using a game object in the video game. The game inputs generate outcomes within the video game, wherein the outcomes are used to define game state of the video game. The game inputs are analyzed to determine when the game inputs result in occurrence of a significant event in the video game, as illustrated in operation 520. There may be any number and types of events that can occur in the video game, wherein each event may occur in response to action(s) from the player(s). An event may be considered a significant event when the resulting outcome is one-of-a-kind event. For example, when a score achieved by a player in a particular level of the video game is higher than any recorded for the video game, then that event is considered to be a significant event. In another example, when a young player (i.e., younger in age or experience) achieves highest number of field goals in a single football game, then the event when the player achieves the highest number of field goals is considered a significant event. When the game inputs provided by the player result in the occurrence of a significant event, the player is awarded a digital asset. The digital asset earned by the player may be a game object with specific attributes that can be used to achieve higher scores or vanquish a monster or earn an extra life, etc. Alternately, the digital asset may be a key or a ticket with capabilities to unlock a specific game object (i.e., game item) or a specific game level in the video game.

A non-fungible token (NFT) is generated for the digital asset earned by the player in the video game, as illustrated in operation 530. The NFT is generated using blockchain technology by creating a data block with metadata that correlates with the details of the significant event and the attributes of the digital asset that was used to achieve the significant event. The generated NFT for the digital asset is associated with the player. Use of the digital asset by the player in the video game is monitored. As and when the digital asset is used to achieve another significant event, the NFT of the digital asset is updated with the details of the other significant event. The digital asset and the NFT of the digital asset can be ported to other video games, in response to a request from the player. As part of porting the digital asset, a second game object in the second video game is identified by mapping attributes defining capabilities, entitlements and functionalities of the digital asset to comparable attributes that is appropriate for the second video game and assigning the identified comparable attributes to the second game object so that the second game object will have the capabilities, functionalities, entitlements that are appropriate for the second video game. The NFT associated with the digital asset is updated to indicate that the digital asset earned in the first video game has been ported to the second video game and is now related to the second game object in the second video game. The second game object and the NFT of the second game object are associated with the player. As and when the second game object is used in the second video game to accomplish a significant event, the NFT associated with the second game object is updated with such use. The NFT provides complete history of the digital asset, including the use history of the digital asset in the first video game and the use history of the second game object in the second video game.

In one implementation, when the digital asset is ported to the second video game, the digital asset earned by the player in the first video game is disabled in the first video game and the second game object is activated in the second video game. The disabling of the digital asset and activating the second game object in place of the digital asset is recorded in the NFT so that the use history can properly account use of the digital asset in the first video game and use of the second game object in the second video game.

Figure 6:
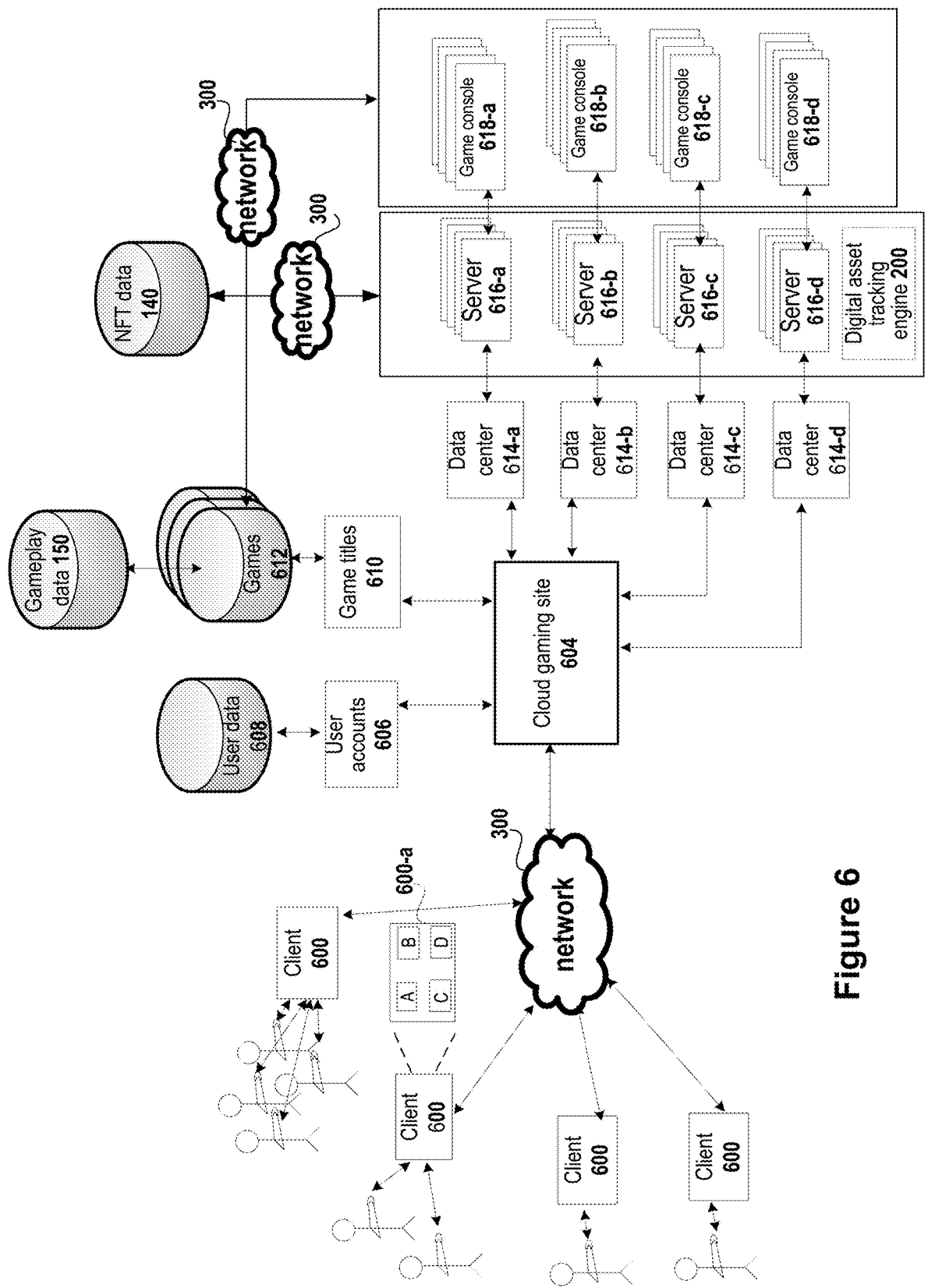
FIG. 6 illustrates a simplified block diagram of a cloud gaming site in which a cloud server used for tracking digital

FIG. 6 illustrates an exemplary system used to load game files for a game available through a cloud gaming site. The system includes a plurality of client devices 600 (101 in FIG. 1) that are communicatively connected to the cloud gaming site 604 over a network 300, which can include a LAN, wired, wireless, cellular (e.g. 4G, 5G, etc.), or any other type of data network, including the Internet. When a request to access the cloud gaming site 604 is received from a client device 600, the cloud gaming site 604 accesses user account information 606 stored in a user data database 608 to identify a user associated with a client device through which the request is initiated. In some embodiments, the cloud gaming site may also validate the identified user in order to determine all the games the user is authorized to view/play. Following user account identification/validation, the cloud gaming site accesses a game titles datastore 610 to identify the game titles that are available at the game cloud site for the user account initiating the request. The game titles datastore 610, in turn, interacts with a games database 612 to obtain the game titles for all the games that are available for the cloud gaming site. As new games are introduced, the games database 612 will be updated with the game code and the game titles datastore 610 will be provided with game titles information for the newly introduced games. Gameplay data resulting from gameplay of the games available in the games database 612 are stored in gameplay data 150 and made available to a digital asset tracking engine 200 executing on the server(s) 616 via the games database 612. The digital asset tracking engine 200 may be executing on one or more servers 616 (server 100 of FIG. 1) of the cloud gaming site 604. The NFTs are generated for one or more digital assets used in each of the games. The generated NFTs are stored in a NFT data datastore 140 maintained in a plurality of servers 616 and made available as and when the NFTs need to be updated or the digital assets have to be verified/validated.

The client device 600 from where the request is initiated may or may not be registered with the cloud gaming site, when the request was initiated. If the user of the client device 600 initiating the request is not a registered user, then the cloud gaming site may identify the user as a new user and select the game titles (for e.g., a default set of game titles) that are appropriate for a new user. The identified game titles are returned to the client device 600 for presenting on a display screen 600-a.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center from among a plurality of data centers (614-a-614-d) where the game is being hosted and sends a signal to the identified data center 614 to load the game associated with the game title for which the user interaction is detected. In some embodiments, more than one data center 614 may be hosting the game. In such embodiments, the cloud gaming site 604 may determine the geo location of the client device initiating the request and identify a data center 614 that is geographically close to the client device 600 and signal the data center 614 to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity/resources to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server 616 from among a plurality of servers at the data center 614 to instantiate the game on the server. The server is selected based on the hardware/software capabilities available and the game requirements. The server may include a plurality of game consoles 618 and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated interactive application, such as the video game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for tracking game objects used in a plurality of video games, comprising:
    receiving a request to transport a digital asset associated with a user in a first video game to a second video game, the digital asset earned by the user for a significant event that occurred in the first video game, the digital asset corresponds to a first game object usable in the first video game and is associated with a non-fungible token (NFT);
    evaluating attributes of the digital asset, wherein at least some of the attributes define capabilities of the first game object that is usable within the first video game;
    translating the capabilities of the first game object in the first video game to comparable capabilities that are appropriate to the second video game by mapping the attributes of the digital asset in the first video game to a comparable second set of attributes identified to be appropriate for the second video game, wherein the comparable capabilities are identified based on a context of a portion of the second video game where the comparable capabilities are to be used to exert effects expected in the portion of the second video game; and
    transporting the digital asset from the first video game to the second video game, in response to the request, the transporting allowing the attributes of the digital asset to be usable by the user to progress in the second video game,
    wherein the transporting includes automatically updating the NFT to associate the digital asset with the second video game.

2. The method of claim 1, wherein evaluating the attributes of the digital asset includes,
    retrieving a descriptor record of the digital asset stored in the NFT, the descriptor record providing details of the digital asset used to accomplish the significant event; and
    interpreting the attributes of the digital asset used for overcoming a challenge in the significant event to identify a first set of capabilities of the digital asset usable in the first video game.

3. The method of claim 1, wherein identifying the comparable capabilities further includes,
    identifying a second game object available in the second video game; and
    assigning the comparable second set of attributes to the second game object, the assigning allowing the second game object to possess the comparable capabilities for use in the second video game.

4. The method of claim 3, wherein assigning the comparable second set of attributes to the second game object results in the second game object acquiring the comparable capabilities required in the second video game.

5. The method of claim 3, wherein assigning the comparable second set of attributes to the second game object includes assigning ownership of the second game object in the second video game to the user and associating the NFT of the digital asset to the second game object, the association of the NFT to the second game object used to track usage of the second game object in the second video game.

6. The method of claim 3, wherein assigning the comparable second set of attributes to the second game object includes de-activating the digital asset in the first video game and activating the second game object in the second video game.

7. The method of claim 3, wherein the second game object in the second video game is owned by the user and the request to transport the digital asset includes a user identifier of a second user and an instruction to transfer ownership of the second game object in the second video game to the second user.

8. The method of claim 7, wherein assigning the comparable second set of attributes includes assigning ownership of the second game object in the second video game to the second user, the NFT of the digital asset updated to associate with the second game object and the second user in the second video game.

9. The method of claim 1, wherein the request to transport the digital asset includes an identifier of a second game object owned by the user in the second video game.

10. The method of claim 1, further comprising:
computing a value to associate with the digital asset, the value computed as a function of an intrinsic value of the significant event that resulted in the user earning the digital asset, the NFT of the digital asset associated with the user and used to monitor use of the digital asset, wherein the intrinsic value is defined based on rarity of occurrence of the significant event.

11. The method of claim 10, wherein the transporting of the digital asset includes assigning the value associated with the digital asset to a second game object, the NFT associated with the second game object reflecting the value.

12. A system for tracking game objects used in a plurality of video games, comprising:
a first game server configured to execute a first game execution engine, the first game execution engine configured to instantiate a first video game in response to selection of the first video game for gameplay by a player;
a second game server configured to execute a second game execution engine, the second game execution engine configured to instantiate a second video game in response to selection of the second video game for gameplay by the player;
a digital asset tracking engine executing on the first game server and communicatively connected to the first game execution engine executing on the first game server, the digital asset tracking engine configured to,
receive a request to transport a digital asset associated with the player in the first video game to the second video game, the digital asset earned by the player for a significant event that occurred in the first video game, the digital asset corresponds to a first game object usable in the first video game and is associated with a non-fungible token (NFT);
evaluate attributes of the digital asset, wherein at least some of the attributes define capabilities of the first game object that is usable within the first video game;
translate the capabilities of the first game object in the first video game to comparable capabilities that are appropriate to the second video game by mapping the attributes of the digital asset in the first video game to a comparable second set of attributes identified to be appropriate for the second video game, wherein the comparable capabilities are identified based on a context of a portion of the second video game where the comparable capabilities are to be used to exert effects expected in the portion of the second video game; and
transport the digital asset from the first video game to the second video game, in response to the request, the transporting allowing the attributes of the digital asset to be usable by the player to progress in the second video game,
wherein the transporting includes automatically updating the NFT to associate the digital asset with the second video game.

13. The system of claim 12, wherein the first game server executing the first game engine is the same as the second game server executing the second game engine.

14. The system of claim 12, wherein the digital asset tracking engine includes a logic engine and a translation engine used during transportation of the digital asset,
wherein the logic engine is configured to,
interpret the attributes included in a descriptor of the digital asset retrieved for the first video game to identify the capabilities of the first game object associated with the digital asset, in response to receiving the request to transport the digital asset received at the digital asset tracking engine;
identify the comparable capabilities that are appropriate to the second video game; and
identify a second game object in the second video game for assigning the comparable second set of attributes; and
wherein the translation engine is configured to,
translate the capabilities of the first game object in the first video game to the comparable capabilities; and
assign the comparable second set of attributes to the second game object, the second game object adopting the comparable capabilities appropriate for the second video game.

15. The system of claim 14, wherein the second game object is associated with the player initiating the request.

16. The system of claim 14, wherein the second game object is associated with a second player, the second player identified based on a user identifier of the second player included in the request to transport the digital asset to the second video game.

* * * * *